Oct. 26, 1965      E. F. NELSON      3,213,540
LEVEL AND SLOPE GAUGE
Filed Feb. 14, 1964
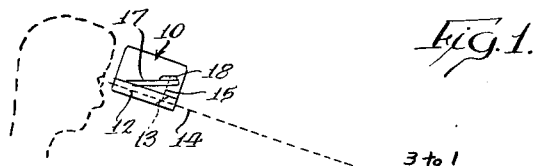
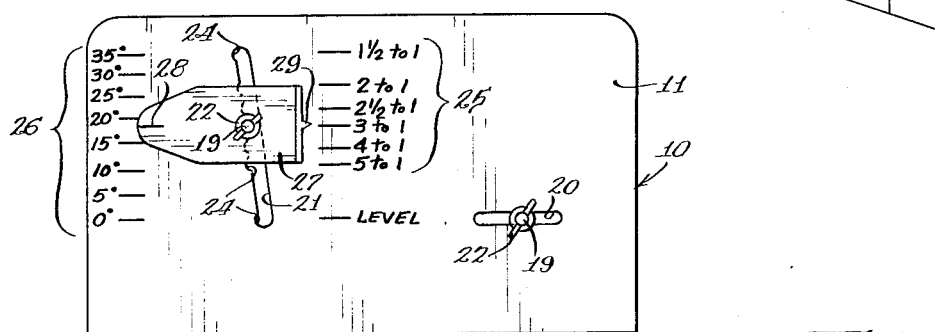
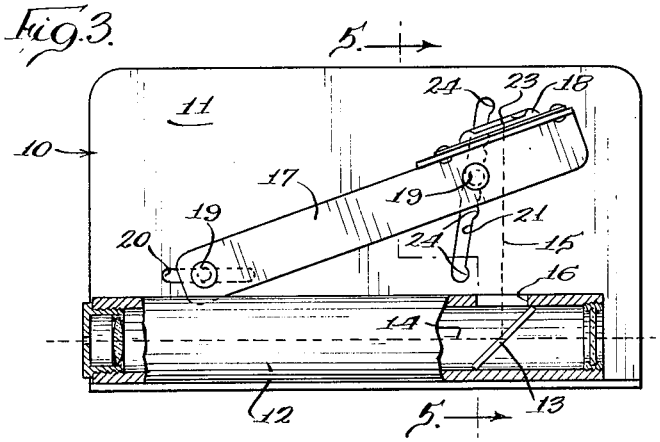
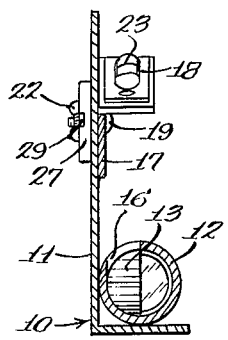
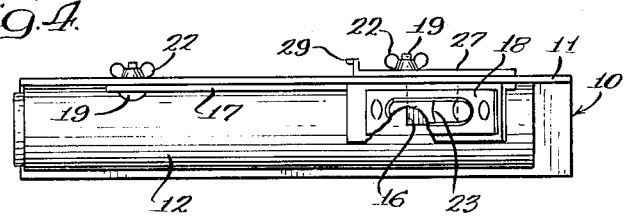
INVENTOR.
Edward F. Nelson
BY
Gary, Parker, Juettner & Cullinan
Attys

United States Patent Office 3,213,540
Patented Oct. 26, 1965

3,213,540
LEVEL AND SLOPE GAUGE
Edward F. Nelson, Bradford, Ill.
Filed Feb. 14, 1964, Ser. No. 345,018
4 Claims. (Cl. 33—70)

The present invention relates to improvements in gauges for determining whether a construction line is level, whether the line has predetermined slope, and/or the actual condition of said line.

In the construction of modern highways, exacting specifications are laid down for every stage of construction, not the least of which are the specifications for the exact incline of each rise and fall and the levelness of level stretches of the highway. This is especially true for the initial or base excavation or cuts and fills of the roadbed.

However, there is no instrument presently in use in the field by which the contractor can conveniently, quickly and accurately determine whether or not he has satisfied the specifications imposed. He must rely upon either a haphazard approximation for his moment-to-moment determinations, followed by an accurate survey, or he must have a surveying crew in almost constant attendance. The latter is not feasible, and the contractor is thus reliant upon an approximate estimation of accuracy, which usually results in considerable re-working of the graded or filled roadbed following accurate survey.

The object of the present invention is to provide a convenient, economical, hand-manipulated instrument that can be carried in a user's pocket and operated by almost anyone to provide an accurate determination of whether a cut or fill is level, or has a predetermined slope, or what the actual condition is.

The instrument preferably consists of a hand-held bracket, a sight tube fixed onto the bracket, an adjustable level carrier movably mounted on the bracket above the sight tube, and a spirit level fixed to the carrier. By virtue of a horizontal slot and an upwardly extended slot in the bracket, the carrier is adjustable to any one of a plurality of positions relative to the sight tube, e.g., level, a slope of one vertical to four horizontal, a slope of one vertical to three horizontal, etc. If desired, the instrument can alternatively or additionally be calibrated in degrees of inclination. However, it is generally conventional in the road building art to refer to slope ratios.

The carrier is apertured below the spirit level so that the spirit level bubble may be viewed from below. The sight tube is provided with a hole aligned with the spirit level and approximately one-half of the view area through the tube is occupied by an inclined mirror so that when a user takes a sight through the tube, one-half of his field of view will be occupied by the sight to be viewed and the other will be occupied by an image of the spirit level.

In use, the carrier is adjusted to the specified condition, i.e., "level" or the stated "slope." The user then sights through the tube, thus simultaneously viewing the surface of the cut or fill and the spirit level. By bringing the spirit level bubble into centered position in his view, the user can then sight along the fill or cut. If the latter sight is along the surface of the cut while the bubble remains centered, the cut or fill operation is being carried out properly. If not, the user can tilt the instrument to sight along the surface of the cut or fill, observing the spirit level as he does do, to tell whether the slope need be increased or decreased to satisfy specifications.

Alternatively, the user can sight along the surface of the fill or cut and then adjust the carrier to bring the spirit level bubble into centered position in his view, whereupon he can observe appropriate indicia on the bracket and carrier to determine the exact condition of the cut or fill, that is, whether it is level or the actual slope it has.

Thus, the user can quickly and conveniently ascertain, by a compact little instrument carried in his pocket, whether or not the operation is being carried out properly without reliance upon haphazard approximations, without requiring constant attendance of a surveying crew, and without risking the likelihood of extensive re-working following an accurate survey.

The above and other objects and advantages of the invention will become apparent in the following detailed description.

Now, in order to acquaint those skilled in the art with the manner of making and using the level and slope guage of my invention, I shall describe, in connection with the accompanying drawing, a preferred embodiment of the gauge and the preferred manners of making and using the same.

In the drawing:

FIGURE 1 is a schematic representation of the mode of use of the gauge of the present invention in checking a slope of three to one;

FIGURE 2 is an elevation of the rear or back side of the gauge showing particularly the calibrating or indicating means thereof;

FIGURE 3 is a view, partly in elevation and partly in section, of the front side of the gauge;

FIGURE 4 is a top plan view, with a portion of the spirit level and its carrier broken away; and FIGURE 5 is a vertical section taken substantially on line 5—5 of FIGURE 3.

Referring now to the drawings, the gauge of the present invention is shown in its preferred embodiment as comprising a bracket 10 preferably of L-shape including an upstanding rectangular gauge plate 11. Fixedly mounted on the upper surface of the horizontal leg of the L flush against the plate 11 is a sight tube 12 of generally known construction.

The sight tube mounts therein a forwardly and upwardly inclined mirror 13, which in the present embodiment is set at an angle of 45 degrees relative to the axis of the tube. As shown in FIGURE 5, the mirror 13 occupies approximately one vertical half of the interior of the tube, so that the area of the tube consists of a straight-ahead viewing or sighting area and a reflective area immediately adjacent thereto. With the mirror set at 45 degrees relative to the sighting axis 14 of the tube 12, the mirror has a reflective axis 15 extending perpendicular to the tube. Aligned with the latter axis is a hole 16 through the tube accommodating viewing via the mirror of level means disposed above the tube.

The level means comprises a level carrier 17 adjustably mounted on the same side of the gauge plate 11 as the tube 12 and a spirit level 18 mounted on the carrier 17 above the hole 16 in the tube in alignment with the reflective axis 15 of the mirror. The carrier 17 suitably comprises a metal strap or plate shorter than the plate 11 and including a portion of generally L-shaped adjacent its forward end, which portion comprises a horizontal leg projecting over the hole 16 in the tube. The latter leg has a cutout therein and the spirit level 18 is mounted above the cutout so that the bubble thereof may be viewed from both above and below.

The level carrier 17 is adjustably mounted on the base plate 11 by means of a pair of studs 19 which project respectively through a horizontal slot 20 paralleling the rearward portion of the tube 12 and an upwardly extending slot 21, which in the present embodiment extends upwardly from adjacent the hole in the tube. For adjustably locking the carrier on the plate, each stud 19 is preferably provided with a wing nut engageable with the rear surface of the gauge plate 11.

The lower end of the upwardly extended slot 21 is preferably disposed in the same horizontal plane as the slot 20 thereby to facilitate adjustment of the carrier 17 and level 18 into a position parallel with the axis of the tube. Also, by adjusting the carrier upon loosening of the nuts 22, the carrier and the level can be disposed at a plurality of inclined positions relative to the tube. The slot 21 is specifically devised, and the slot 20 is provided to accommodate horizontal movement, so that the carrier can only move in such direction that the midpoint or hairline 23 of the spirit level is always aligned with the reflective axis 15 of the mirror 13. Thus, the center of the level is always visible through the mirror.

To facilitate setting of the level carrier to various slopes relative to the sight tube 12, the upwardly extended slot 21 is provided at predetermined spaced locations with indentations or notches 24 adapted for reception of the respective stud 19. These notches are preferably provided for the "level" or horizontal position of the carrier 17 and for each of several frequently used slopes, such as five to one, four to one, three to one, two and one-half to one, two to one and one and one-half to one. In modern-day road construction, slopes higher than one and one-half are rarely encountered and this is therefore the maximum slope that need be accommodated by a practical instrument. Higher slopes can, of course, be accommodated if desired. Preferably, each of the notches 24 is marked by indicia 25 on the back of the gauge plate 11.

In addition, I prefer to equip my gauge with indicator or calibration means facilitating adjustment of the same to various angles as expressed in degrees rather than slope ratios. For this purpose, I provide the forward edge of the rear face of the gauge plate with vertically spaced indicia 26 calibrated in degrees of angle, and I mount an indicator 27 on the vertically movable carrier stud 19 at the rear face of the gauge plate. The indicator 27 is provided with a forwardly disposed hairline 28 adapted to be aligned horizontally with each of the indicia 26 thereby to accommodate adjustment of the carrier to any angular inclination from zero up to about 35 degrees in the embodiment. The indicator also preferably includes a pointer 29 adjacent the indicia 25 facilitating setting of the gauge to a predetermined slope, and also facilitating conversion of angles to slopes and vice versa.

In a practical commercial embodiment of the illustrated and described gauge, the same may conveniently and economically be fabricated in a size of about 3¼ inches high, 5½ inches long and 1 inch total thickness, whereby the same is a low-cost instrument that may conveniently be carried in the user's pocket where it is ready for use at any desired time.

To use the gauge for checking a fill or cut, for example, the specification for which requires a slope of three to one, the user simply loosens the nuts 22 and slides the carrier 17 to the position where the vertically movable stud 19 engages in the three to one notch 24 and the indicator pointer 29 aligns with the three to one indicia. The user then tightens the nuts 22 and brings the gauge to his eye, as shown in FIGURE 1, in a position generally to sight along the surface of the sloping cut or fill. If he simultaneously sights both the bubble of the spirit level centered on the hairline 23 and the surface of the cut or fill, the same is formed in accordance with specifications. If not, he can swing the gauge back and forth in a slight vertical arc and simultaneously observe the spirit level bubble and the surface of the cut or fill and determine thereby whether the slope is too steep or too gradual. Alternatively, he can loosen the nuts 22, sight through the tube along the surface of the ground, manipulate the carrier 17 to center the spirit level bubble on its hairline, and then read the position of the indicator 27 relative to the indicia 25 and 26 to ascertain the exact condition of the slope and thereby determine what need be done to correct the slope to satisfy specifications.

Thus, the present invention provides a conveniently manipulated low cost instrument adapted to be carried in the user's pocket to facilitate instantaneous, accurate determination of the surface character of a road cut or fill. Consequently, the objects and advantages of the invention have been shown herein to be attained in a convenient, economical and practical manner.

While I have shown and described what I regard to be the preferred embodiment of my invention, and a preferred use thereof, it will be appreciated that various changes, rearrangements and modifications may be made therein and that the same may be put to other uses without departing from the scope of the invention, as defined by the appended claims.

I claim:

1. A level and slope gauge comprising a gauge plate, a sight tube secured to said plate, an inclined mirror in said tube occupying a portion only of the sighting area through the tube, a hole in the side wall of the tube aligned with the reflective axis of the mirror, a first slot in said plate generally paralleling said tube, a second slot in said plate extending upwardly from said tube, a level carrier adjustably mounted on said plate above said tube by a pair of stubs extending respectively through said slots, and a spirit level on said carrier adjacent said second slot and projecting over said hole in said tube, said slots accommodating adjustment of said carrier on said plate throughout a range of inclinations relative to said tube but always maintaining said spirit level substantially on the reflective axis of said mirror for exposing said spirit level to view within the sight tube adjacent the remaining sighting area through the tube.

2. A level and slope gauge comprising an upright rectangular mounting plate, a sighting tube secured to said plate adjacent the lower edge thereof, said tube having a forwardly and upwardly inclined mirror therein occupying a portion only of the sighting area through the tube, a hole in the tube above said mirror aligned with the axis of reflection of the mirror, a first slot in said plate above the rearward part of and generally parallel to said sight tube, a second slot in said plate forwardly of and extending upwardly from said first slot and having its lower end aligned with said first slot in the direction parallel to said sight tube, a level carrier, studs on said carrier extending through said slots and adjustably mounting said carrier on said plate, and a spirit level on said carrier above said hole in said tube, said slots guiding said carrier for adjustment on said plate parallel and at various inclinations to said tube and maintaining said spirit level long the axis of reflection of said mirror.

3. A level and slope gauge comprising an upright mounting plate, a sight tube secured to said plate adjacent the lower edge thereof, said tube having a forwardly and upwardly inclined mirror therein occupying a portion only of the sighting area through the tube, a hole in the tube above said mirror aligned with the axis of reflection of the mirror, a first slot in said plate generally parallel to said sight tube, a second slot in said plate extending upwardly from said sight tube, a level carrier, studs on said carrier extending through said slots and adjustably mounting said carrier on said plate, a spirit level on said carrier above said hole in said tube, said slots guiding said carrier for adjustment on said plate while maintaining said spirit level along the axis of reflection of said mirror, and notches in said second slot facilitating adjustment of said carrier to positions of predetermined inclination relative to said tube.

4. A level and slope gauge comprising an upright mounting plate, a sight tube secured to said plate adjacent the lower edge thereof, said tube having a forwardly and upwardly inclined mirror therein occupying a portion only of the sighting area through the tube, a hole in the tube above said mirror aligned with the axis of reflection of the mirror, a first slot in said plate generally parallel to said sight tube, a second slot in said plate extending upwardly from said sight tube, a level carrier, studs on said carrier extending through said slots and adjustable mounting said carrier on said plate, a spirit level on said carrier above said hole in said tube, said slots guiding said carrier for adjustment on said plate while maintaining said spirit level along the axis of reflection of said mirror, indicia on said plate indicating various inclinations of said carrier relative to said tube, and an indicator on said carrier cooperable with said indicia and facilitating adjustment of said carrier to positions of predetermined inclination relative to said tube.

References Cited by the Examiner

UNITED STATES PATENTS

| | | | |
|---|---|---|---|
| 743,100 | 11/03 | Potter | 33—213 |
| 1,168,295 | 1/16 | Fag et al. | 33—70 |
| 1,298,024 | 3/19 | Ellison | 33—213 |
| 2,458,054 | 1/49 | Brown | 33—75 |

ISAAC LISANN, *Primary Examiner.*